(12) United States Patent
Zaum et al.

(10) Patent No.: US 11,852,742 B2
(45) Date of Patent: Dec. 26, 2023

(54) METHOD FOR GENERATING A MAP OF THE SURROUNDINGS OF A VEHICLE

(71) Applicant: Robert Bosch GmbH, Stuttgart (DE)

(72) Inventors: Daniel Zaum, Sarstedt (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 506 days.

(21) Appl. No.: 17/267,977

(22) PCT Filed: Aug. 10, 2019

(86) PCT No.: PCT/EP2019/071515
§ 371 (c)(1),
(2) Date: Feb. 11, 2021

(87) PCT Pub. No.: WO2020/048734
PCT Pub. Date: Mar. 12, 2020

(65) Prior Publication Data
US 2021/0231769 A1   Jul. 29, 2021

(30) Foreign Application Priority Data
Sep. 4, 2018 (DE) .......................... 102018214971.2

(51) Int. Cl.
*G01S 13/89* (2006.01)
*G01S 7/00* (2006.01)
(Continued)

(52) U.S. Cl.
CPC ............ *G01S 7/003* (2013.01); *G01S 13/862* (2013.01); *G01S 13/865* (2013.01);
(Continued)

(58) Field of Classification Search
CPC ...... G01S 7/003; G01S 13/862; G01S 13/865; G01S 13/867; G01S 13/89; G01S 13/931;
(Continued)

(56) References Cited

U.S. PATENT DOCUMENTS

2018/0074506 A1   3/2018   Branson

FOREIGN PATENT DOCUMENTS

| DE | 69823462 T2 | 4/2005 |
|---|---|---|
| DE | 102014011108 A1 | 1/2016 |

(Continued)

OTHER PUBLICATIONS

International Search Report forPCT/EP2019/071515, dated Nov. 15, 2019.

*Primary Examiner* — Mathew Franklin Gordon
(74) *Attorney, Agent, or Firm* — NORTON ROSE FULBRIGHT US LLP; Gerard Messina

(57) ABSTRACT

A method for generating a map of the surroundings of a vehicle including at least one sensor. First data are acquired by the vehicle, the first data including a position of the vehicle and information about the type of the sensor. The first data are transmitted to a central device by the vehicle. Perception parameters are selected by the central device in view of the transmitted first data. The selected perception parameters are received by the vehicle, and the sensor is configured, using the selected perception parameters. The surroundings of the vehicle are monitored by the sensor, raw data being recorded, and the raw data being filtered by the vehicle, using the selected perception parameters. Second data are transmitted to the central device by the vehicle, the second data representing the monitored surroundings. A map is generated and/or updated by the central device based on the second data.

11 Claims, 1 Drawing Sheet

(51) Int. Cl.
   *G01S 13/86* (2006.01)
   *G01S 13/931* (2020.01)
   *G01S 7/40* (2006.01)

(52) U.S. Cl.
   CPC ............ *G01S 13/867* (2013.01); *G01S 13/89* (2013.01); *G01S 13/931* (2013.01); *G01S 7/40* (2013.01); *G01S 2013/9316* (2020.01); *G01S 2013/9323* (2020.01); *G01S 2013/9324* (2020.01)

(58) Field of Classification Search
   CPC ..... G01S 2013/9323; G01S 2013/9316; G01S 2013/9324; G01S 7/40
   See application file for complete search history.

(56) References Cited

FOREIGN PATENT DOCUMENTS

| | | |
|---|---|---|
| DE | 102014015073 A1 | 4/2016 |
| DE | 102015211467 B3 | 5/2016 |
| DE | 102015206605 A1 | 10/2016 |
| DE | 102016103251 A1 | 8/2017 |
| DE | 102016214868 A1 | 2/2018 |
| DE | 102017125844 A1 | 5/2018 |
| WO | 2016032780 A1 | 3/2016 |

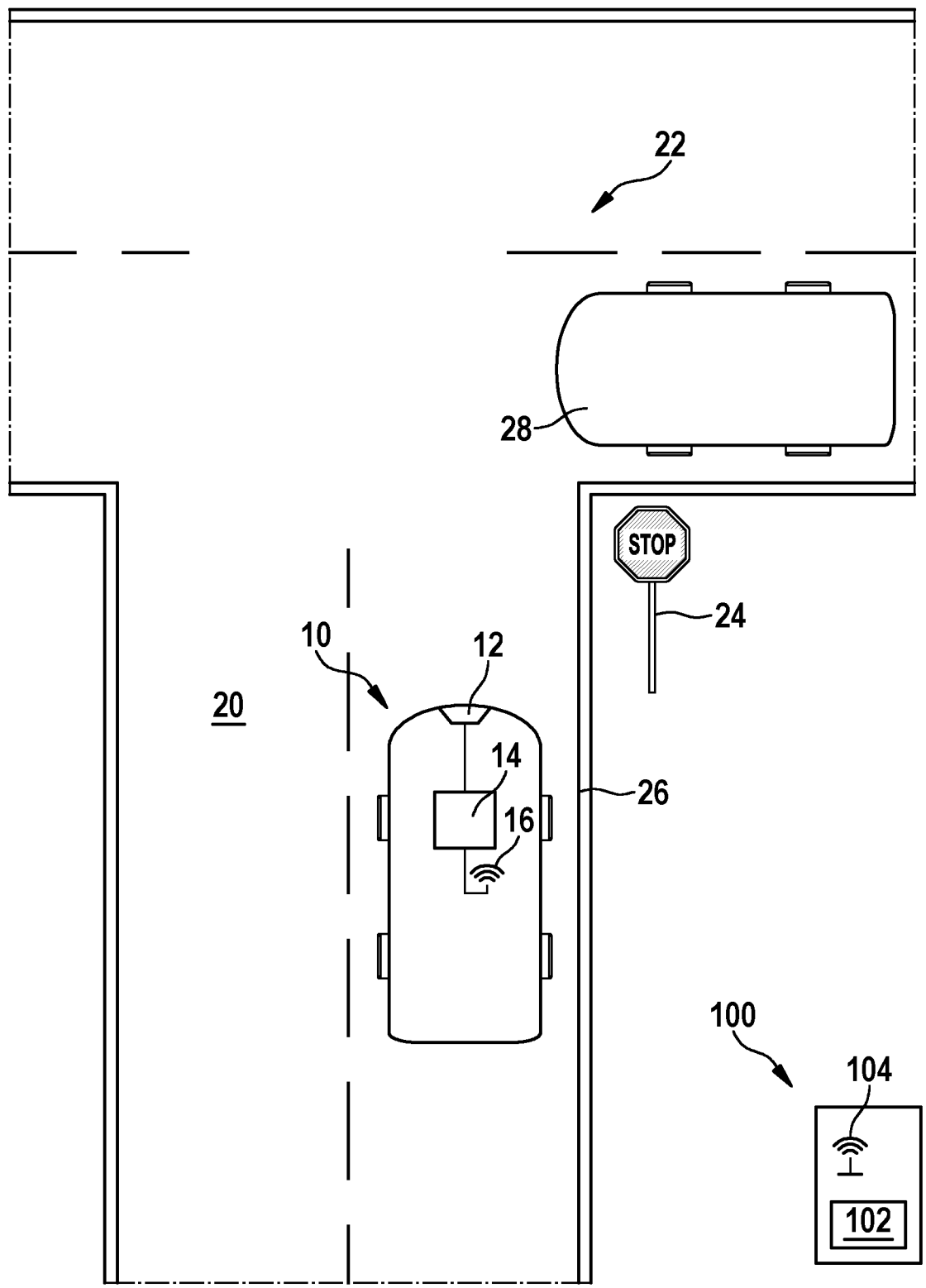

METHOD FOR GENERATING A MAP OF THE SURROUNDINGS OF A VEHICLE

FIELD

The present invention relates to a method for generating a map of the surroundings of a vehicle; the vehicle including at least one sensor; and in the method, data being acquired and transmitted to a central device. Further aspects of the present invention include a central device, as well as a vehicle, which are configured for use with the method.

BACKGROUND INFORMATION

The monitoring of the vehicle surroundings, using sensors such as radar sensors and video cameras, is a fundamental part of modern driver assistance systems and automated vehicle systems. In order to be able to provide precise data about the vehicle surroundings, the sensors must be able to detect many different types of objects, such as traffic signs and curbs, in a multitude of possible environmental conditions.

A method of operating a sensor for monitoring the surroundings of a vehicle is described in German Patent Application No. DE 10 2016 103251 A1. In the method, at least one data record is generated, using a data processing device; the at least one data record describing a current and/or future state of the surrounding area. A control signal for controlling an operating state of the sensor and/or for controlling data processing of sensor data of the sensor is generated by a control device as a function of the at least one data record. For example, by evaluating the data record, using the data processing device, objects or weather conditions on a roadway may be ascertained.

The operating state of the sensor and/or the processing of the sensor data of the control device may be adapted as a function of the ascertained objects and/or the weather conditions. For example, the sensor may be a radar sensor.

A method and a device for adjusting the sensitivity of an ultrasonic sensor are described in German Patent No. DE 10 2015 211467 B3. The sensitivity of an ultrasonic sensor of a motor vehicle is adjusted adaptively; an interference threshold value for suppressing interference being specified. In this context, the interference threshold value is ascertained during the operation of a predefined function of an assistance system. During the adaptive adjustment, it is ensured that in an important range, the ultrasonic sensor is not set to be so insensitive, that the ability to implement the assistance system is put at risk.

A method for operating a driver assistance system is described in German Patent Application No. DE 10 2014 011108 A1. In the method, it is provided that the acquisition of sensor data by a sensor be adapted as a function of parking area data, by adjusting a detection parameter of the sensor or a processing parameter. For example, it is possible to adjust threshold values during the processing of sensor data. For example, a radar sensor or an ultrasonic sensor may be used as a sensor. The parking area data may be taken from a preselected map.

One disadvantage of the conventional methods is that it is not possible to select optimum parameters in a deliberate manner to monitor the surroundings.

SUMMARY

In accordance with an example embodiment of the present invention, a method for generating a map of the surroundings of a vehicle is provided; the vehicle including at least one sensor. In a first step a) of the method, first data are acquired by the vehicle; the first data including at least a position of the vehicle and information about the type of the at least one sensor. In a following step b), the first data are transmitted by the vehicle to a central device. Subsequently, in a step c), perception parameters are selected by the central device in view of the first data. Then, in a step d), the selected perception parameters are then transmitted by the central device to the vehicle. In a subsequent step e), the selected perception parameters are received by the vehicle, and the at least one sensor is configured, using the selected perception parameters. Afterwards, in a step f), the surroundings of the vehicle are monitored by the at least one sensor; raw data being recorded, and the raw data being filtered by the vehicle, using the selected perception parameters. In a following step g), second data are transmitted by the vehicle to the central device; the second data being based on the raw data and representing the monitored surroundings. In a subsequent step h), a map is generated and/or updated by the central device on the basis of the second data.

The example method may be run through one time or run through several times. In particular, it is possible for the method to be run through continually during the operation of a vehicle, in particular, during a trip of the vehicle; in particular, in a continual manner, a position of the vehicle being determined and transmitted to a central device, the perception parameters of the vehicle being adapted, using perception parameters selected by the central device, the surroundings being monitored, and data, which represent the surroundings, being transmitted to the central device. Accordingly, it is preferable for the central device to update the map continually, when new data are present.

In step a) of the method, a position of the vehicle is initially determined by it. In this connection, it is initially completely sufficient for the position of the vehicle to only be able to be determined approximately. For a rough determination of the position, a reading, which is accurate to within 100 m, preferably, to within 50 m, and particularly preferably, to within 10 m, is sufficient. Such a determination of position may be carried out, for example, by evaluating radio signals of communications devices, for example, evaluating signals of mobile radio communications base stations or WLAN base stations. In addition, or alternatively, the vehicle position is preferably determined, using a satellite navigation system, such as GPS; then, a more exact determination of the vehicle position having an accuracy of within 20 m, preferably, within 10 m and, particular preferably, within 5 m, being preferred.

In addition, it is preferable for an orientation of the vehicle to be determined, for example, using an electronic compass, or by evaluating a path of consecutively determined positions of the vehicle, while it moves.

Accordingly, it is preferable for the first data to include a vehicle position transmitted with the aid of satellite navigation and/or an orientation of the vehicle. The combination of vehicle position and orientation of the vehicle yields an estimated attitude of the vehicle.

The first data additionally include information about the type of the at least one sensor. This information may include, for example, information regarding the type of sensor or also a serial number of the sensor, in order to be able to identify it accurately. In addition, it is possible for the type of vehicle or a unique identification of the vehicle to be transmitted as information regarding the type of the at least one sensor; a database, which includes information about the type of sensors assigned to the respective vehicles or types of vehicles, then being made available to the central device.

In step b) of the example method, the data are transmitted to a central device. Data may be transmitted between the vehicle and the central device, using any method customary to one skilled in the art. In particular, wireless communication methods, such as mobile radio communication, e.g., GSM, UMTS, LTE, as well as WLAN or Bluetooth, are suitable. It is particularly preferable for a mobile Internet connection to be used; accordingly, the central device then being connected to the Internet, as well.

In step c) of the example method, perception parameters are selected by the central device. In this context, the central device takes into account the previously transmitted, first data, which contain at least information regarding the type of sensor and the place, at which the vehicle and, therefore, the sensor are located.

The central device preferably includes a map, which provides, for different types of sensors, optimum perception parameters for different locations. In this manner, it is possible to select perception parameters adapted to the specific location and, therefore, to the environmental conditions present at the specific location. For example, the optimum perception parameters may be determined, for example, in view of experiences with the processing of sensor data. The perception parameters are preferably ascertained in an automated manner; to that end, for example, machine-learning methods being able to be used.

The perception parameters include, in particular, sensor parameters for the at least one sensor, as well as filter parameters for filtering the raw data acquired from the sensor. Through this, it is possible to specify optimum sensor parameters and filter parameters, in particular, as a function of the place, at which the vehicle is located. Thus, for example, for precise monitoring of the surrounding area, it is advantageous to specify other sensor parameters and filter parameters in closed environments, such as tunnels, parking garages, underground parking garages, or narrow alleys, than in more open environments, such as country roads and expressways.

For selecting the optimum perception parameters, the central device has a map, in which, in each instance, optimum perception parameters are stored for different types of sensors and for different locations. From the map, the central device selects, in each instance, the optimum perception parameters stored there for the sensor specified for the first data, for the location specified in the map.

In addition to the location of the vehicle, the orientation of the vehicle may also be important for the selection of the perception parameters. Thus, for example, different perception parameters may be selected, for example, using knowledge of the orientation of the vehicle, depending on whether the vehicle is traveling uphill or downhill. In addition, in combination with knowledge of the current time of day, it is possible to make the perception parameters a function of the position of the sun and the orientation of the vehicle with respect to the sun, as well. This is then advantageous, in particular, if the sensor is an optical sensor.

The sensor parameters, which are included in the perception parameters, are preferably matched to the specific type of sensor. For example, in the case of a radar sensor, the sensor parameters may include information regarding a radar cross section. In the case of an ultrasonic sensor, the sensor parameters may include, for example, an interference threshold value.

In addition, as a fallback measure, standard values for the different types of sensors may be stored in the central device, if optimized perception parameters are not yet stored for the specific vehicle position or orientation of the vehicle.

The first data preferably include additional information regarding current environmental conditions at the position of the vehicle, and/or the central device obtains information about current environmental conditions at the position of the vehicle via a meteorological service.

The vehicle may acquire information about the current environmental conditions, using the at least one sensor of the vehicle, and, in some instances, using further sensors, which are assigned to the vehicle. Such environmental conditions may include, for example, the temperature, humidity, precipitation or information regarding the condition of the roadway. Alternatively, or in addition, using a connection to a meteorological service, the central device may obtain such environmental data for the place, at which the vehicle is presently located, via an external service provider, such as a meteorological service.

Preferably, this information about current environmental conditions is also utilized for selecting optimum perception parameters. Thus, e.g., for an optical sensor, it is advantageous to use sensor parameters during the day that are different from those at night. Furthermore, many types of sensors are limited by precipitation, such as rain or snow, which means that adapted sensor parameters and/or filter parameters have an advantageous effect on the measuring result.

The central device preferably selects the perception parameters in such a manner, that they are, in particular, suitable for generating a map; the selection being made as a function of the position of the vehicle, the orientation of the vehicle, and/or the current environmental conditions.

Perception parameters suitable for generating a map enable a high detection rate for selected static, that is, stationary objects, which are particularly well-suited for generating and/or updating a map. Such static objects, which are used for generating the map of the surroundings of the vehicle, include, in particular, traffic symbols, such as traffic signs or traffic lights, and objects delimiting the roadway, such as curbs, trees, guardrails, garbage cans, and the like. The optimum perception parameters may vary as a function of environmental conditions, such as weather and orientation of the vehicle. In this context, in particular, the sensor parameters and/or the filter parameters are adapted for reliable detection of these static objects.

After the optimum perception parameters are selected by the central device, these are transmitted to the vehicle in accordance with step d) of the method. Preferably, the same connecting method is selected for the connection between the central device and the vehicle as in step b), in which the first data are transmitted to the central device. The vehicle preferably has a mobile Internet connection, which means that the selected perception parameters may be transmitted to the vehicle via the Internet.

In step e) of the method, the at least one sensor of the vehicle is configured, using the received, selected perception parameters. Thus, for example, in the case of a radar sensor, a radar cross section may be set, and, for example, in the case of an ultrasonic sensor, an interference threshold value may be set.

In subsequent step f) of the method, the surroundings of the vehicle are monitored, using the at least one sensor. In this context, the vehicle may be standing or moving. In this instance, raw data are recorded by the at least one sensor, the raw data being subsequently filtered.

Sources of interference are preferably filtered out, using the filtering. In the case of active sensors, such as radar, lidar or ultrasonic sensors, such sources of interference may include, for example, signals emitted by sensors of other vehicles. In addition, the raw data always contain a certain amount of background noise, which is a function of the environment, in which the vehicle is presently located. Furthermore, interference may be caused by environmental influences, such as rain, snow or fog; during operation of a lidar sensor, for example, the laser beam used for this purpose being able to be reflected by water droplets in the air and consequently being able to cause interference.

Using the filtering step, filtered, raw data are obtained, which are suitable, in particular, for enabling the object generation and/or the aggregation of the data. During object generation and/or aggregation, objects are detected in the filtered, raw data. Depending on the type of sensor, the filtered raw data include, for example, a position relative to the vehicle, at which a signal of the sensor has been reflected.

In the scope of object generation and/or aggregation, the filtered raw data are combined to form objects. In this context, all raw data, which represent data about a particular object in the surroundings of the vehicle, are assigned to this object. Such objects may be static objects, which do not move and are stationary, or dynamic objects, which are in motion.

Since the static objects are particularly relevant to the generation of a map of the surroundings, it is preferable for only the static objects to be used for further processing. In alternative specific embodiments, both static and dynamic objects are preferably used.

Dynamic, that is, moving objects may include, for example, pedestrians or other vehicles. Static, that is, stationary objects, which are used for generating the map of the surroundings of the vehicle, include, in particular, traffic symbols, such as traffic signs or traffic lights, and objects delimiting the roadway, such as curbs, trees, guardrails, garbage cans, and the like. In the case of sensors, such as radar sensors, which may also provide sensor data specific to the background, the road itself is also regarded as an object, which is taken into account in the generation of the map of the surroundings. For example, data, which are characteristic of particular sections of a road, may be acquired by radar sensors.

In one specific embodiment of the present invention, it is provided that prior to the transmission of the second data, detection of objects in the filtered raw data be carried out by the vehicle itself. Therefore, in this variant, aggregation and/or object generation is carried out before the second data are transmitted to the central device. Then, the second data include recognized objects.

Alternatively, or in addition to that, it is preferable for detection of objects in the filtered raw data to be carried out by the central device. Accordingly, in this case, objects are detected after the second data are transmitted to the central device. The second data then include the filtered raw data.

Thus, the second data preferably include filtered raw data and/or detected objects. In specific embodiments, in which detection of objects is already carried out by the vehicle, it may also be provided that not only information about the known objects, but also the filtered raw data be included in the second data. If no further evaluation of the raw data is done by the central device, then, of course, the incorporation of the filtered raw data into the second data may also be dispensed with.

The second data are transmitted to the central device, using, preferably, the same transmission method that is also employed for transmitting the first data.

In step h) of the example method, a map of the surroundings is generated and/or updated by the central device on the basis of the second data. To that end, the central device uses information, which is extracted from detected objects. For example, the course of a road may be reconstructed by detecting objects delimiting a roadway, such as curbs; and traffic routing, which may include, in particular, the permissible direction of travel in each of the detected traffic lanes, may be ascertained from detected traffic symbols, such as traffic signs or traffic lights. In addition, the map preferably includes information, such as the position, attitude, size and the like, of the detected objects.

In the method for generating and/or updating a map, a plurality of vehicles are preferably involved, so that large regions may be mapped in a short time and with low expenditure. In addition, the contribution of several vehicles may allow the map to be updated regularly, and consequently, the information about the surroundings contained in the map is up-to-date.

The map generated by the central device is particularly suitable for planning a safe route or trajectory to guide a vehicle from a starting location to a destination. In particular, for automated guidance of the vehicle within the scope of an autonomous driving function, in which the vehicle takes over both the longitudinal guidance, that is, the acceleration and braking, and the lateral guidance, that is, the steering, then, in addition to accurate maps, exact locating of the vehicle is also necessary. Determining the position of the vehicle with the aid of a satellite navigation system alone is often not sufficient for this. Instead, a vehicle may initially determine its position approximately with the aid of a satellite navigation system and transmit it to the central device. The vehicle may then receive a section of the map, which includes, in particular, the objects detected beforehand by other vehicles. By comparing information about objects, which the vehicle ascertains using its own sensors, to the information about these objects stored in the map, the position of the vehicle may then be determined accurately.

Therefore, in the example method, it is additionally preferable for the generated map to be provided to a driver assistance system of the vehicle; at least a section of the map being transmitted to the vehicle by the central device. In this context, the section of the map transmitted by the central device is preferably determined by the vehicle position ascertained by the vehicle within the scope of the first data.

A further aspect of the present invention is to provide a central device, which includes a communications device. In accordance with an example embodiment of the present invention, the central device is configured to execute the steps of one of the methods described here, which steps are intended to be executed by the central device. Accordingly, the features described within the scope of one of the methods apply correspondingly to the central device, and conversely, the features described within the scope of the central device apply correspondingly to the methods.

The central device preferably takes the form of a server device, such as a cloud server. The central device includes a communications device, which is configured to receive first data and second data from vehicles and to transmit selected perception parameters to a vehicle. Accordingly, the communications device is preferably configured to communicate with a vehicle via a wireless connection, such as a mobile radio communications connection, WLAN or Bluetooth. In addition, it is possible for the communications device to be configured to establish an Internet connection, and for the central device to accordingly communicate with vehicles, which have a mobile Internet connection.

The central device may be configured to make the map generated in the course of the method available to a vehicle or other users, for example, via the Internet. In addition, the central device may be configured to communicate with other service providers, such as suppliers of weather data. Such communication may take place, for example, via the Internet, as well.

One further aspect of the present invention is to provide a vehicle including at least one sensor and a communications unit. In accordance with an example embodiment of the present invention, the vehicle is configured to execute the steps of one of the methods described here, which steps are intended to be executed by the vehicle. Accordingly, features described in the scope of one of the methods apply correspondingly to the vehicle, and conversely, the features described within the scope of the vehicle apply correspondingly to the methods.

The at least one sensor is preferably selected from a radar sensor, an ultrasonic sensor, a lidar sensor, an optical sensor, such as a video camera, or a combination of a plurality of these sensors.

The vehicle preferably includes more than one sensor; in this context, a plurality of sensors of the same type being able to be used, and/or the vehicle being able to have different types of sensors. For example, the vehicle may have a radar sensor aligned in the forward direction and twelve ultrasonic sensors distributed around the vehicle. In this context, the at least one sensor is equipped to acquire data regarding the surroundings of the vehicle. In this instance, in particular, objects in the surroundings of the vehicle are detected by the specific sensor.

In addition, the vehicle may have further sensors, which are configured to detect environmental conditions, for example, a thermometer for measuring a temperature, a hygrometer for measuring humidity, or a rain sensor for detecting precipitation.

The communications unit of the vehicle is configured, in particular, for wireless communication with the central device. For example, the communications unit is configured to communicate via a mobile radio communications connection, such as GSM, UMTS or LTE, WLAN, or Bluetooth. The communications unit is preferably configured to establish an Internet connection and to communicate with the central device via this Internet connection.

In the method for generating a map of the surroundings of a vehicle in accordance with an example embodiment of the present invention, at least one sensor of this vehicle is used, in order to acquire data, which represent the surrounding area, and to transmit them to a central device. In this context, it is preferable for a position of the vehicle to be initially determined in an approximate manner and transmitted to the central device. This then selects sensor parameters and filter parameters, which are suitable for this location and are transmitted to the vehicle. In this manner, it is ensured that the at least one sensor of the vehicle is always operated, using optimum parameters, in order, on one hand, to be sufficiently precise and sensitive to be able to detect all relevant objects in the surrounding area and, on the other hand, to prevent instances of false detection due to interference.

During the monitoring of the surrounding area of the vehicle by the at least one sensor, in addition to data that represent actual objects in the surrounding area, noise and other interference are also received. This background noise of the surrounding area, as well as other possible interference, such as signals from the sensors of other vehicles, must be reliably suppressed and/or filtered out. To this end, the present invention initially provides for the sensor to be optimally configured, so that it is adapted to the environmental conditions currently present, which may be, in particular, a function of the location and weather. This may already allow the occurrence of instances of false detection to be reduced considerably. The raw data supplied by the sensor are subsequently subjected to filtering; the utilized filter also being adapted to the environmental conditions currently present. This allows the quality of the obtained, filtered data to be optimal for further processing.

In one variant of the method in accordance with the present invention, object detection and/or aggregation of the data is already advantageously carried out by the vehicle. During this object detection and/or aggregation of the data, sensor data, which belong to a single object, are combined, and the objects are detected. In this case, only a smaller quantity of data has to be transmitted subsequently, in order to signal the result back to the central device as second data. As an alternative to that, the filtered raw data may be transmitted to the central device; in this case, to be sure, a larger volume of data being obtained, but as a rule, a higher amount of computing power being available for the evaluation.

In any case, high-quality data are available to the central device for generating the map; the data including information about the objects detected in the surroundings of the vehicle.

Using the evaluation of these data, during which, for example, object classification may be implemented and, consequently, the objects may be determined accurately, a map may be subsequently generated, and/or an existing map may be updated. Since not a single vehicle, but a plurality of vehicles are involved in the method, a large region may be mapped in a short time, and regions already mapped may be updated often, so that the map is always up-to-date.

The map generated in this manner is suitable, in particular, for assisting a vehicle with the navigation, as well as with the determination of its own exact position. To this end, in advantageous specific embodiments of the method, it is provided that after the transmission of an approximate position of the vehicle, a corresponding section of the map be transmitted to the vehicle. Then, the vehicle may determine its exact position simply by comparing the objects included in the map to the objects ascertained by sensors of the vehicle.

BRIEF DESCRIPTION OF THE DRAWINGS

An exemplary embodiment of the present invention is represented in the FIGURE and explained in greater detail in the description below.

FIG. 1 schematically shows a vehicle during the monitoring of the surrounding area, in accordance with an example embodiment of the present invention.

DETAILED DESCRIPTION OF EXAMPLE EMBODIMENTS

FIG. 1 shows a vehicle 10, which travels on a road 20 and approaches an intersection 22. Vehicle 10 includes a sensor 12, which is connected to a control unit 14. Control unit 14 has, in turn, a connection to a communications unit 16. In the exemplary embodiment represented in FIG. 1, vehicle 10 includes only one sensor 12; of course, in other specific embodiments, a plurality of sensors 12 may be mounted.

While vehicle 10 travels along road 20, control unit 14 detects the approximate position of vehicle 10, using a satellite navigation system. This approximate position is continually updated during the trip; vehicle 10 also determining its direction of travel by comparing a plurality of these approximate positions. Together with an information item about the type of sensor 12, the current position and orientation of vehicle 10 ascertained in this manner are transmitted as first data to a central device 100.

Central device 100 includes a computing device 102, as well as a communications device 104. Communications device 104 is configured to communicate with the corresponding communications unit 16 of vehicle 10. After receiving the first data, which have been transmitted by vehicle 10, computing device 102 selects optimum perception parameters, by which sensor 12 may be optimally configured for the surrounding area, in which vehicle is located. In the present case, vehicle 10 is located on a road 20, which is narrow, and accordingly receives parameters adapted to this situation from central device 100. To carry out this selection, computing device 102 includes a map, for which perception parameters optimal for sensor 12 of vehicle 10 are stored as a function of the location of vehicle 10. The selected perception parameters are transmitted to vehicle 10, using communications device 104.

Vehicle 10 receives the perception parameters and subsequently configures its sensor 12 accordingly, using sensor parameters contained in the perception parameters. Now, the surroundings of vehicle 10 are monitored, using the optimally configured sensor 12. If sensor 12 takes the form, for example, of a radar sensor, then radar signals are emitted, and echoes reflected by objects in the surrounding area are received again. In the example represented in FIG. 1, in particular, echoes from a curb 26, a traffic sign 24, and a further vehicle 28 are received. In addition, the radar sensor receives characteristic echo signals from road 20 itself. The raw data received from sensor 12 in this manner are subsequently filtered by control unit 14; the filter being set, using filter parameters contained in the perception parameters.

In one specific embodiment, the filtered raw data are subsequently transmitted as second data to central device 100, using communications unit 16. Computing device 102 of central device 100 then carries out object detection and/or aggregation of the received, filtered raw data; objects in the surrounding area of vehicle 10 being detected. The detected objects are subsequently added to a map of the surroundings, which is stored in computing device 102.

As an alternative to this, control unit 14 may already carry out the object detection and/or aggregation of data, so that only data about the detected objects have to be transmitted as second data to central device 100, using communications unit 16.

Using data about the detected objects, a surrounding-area map is generated and/or updated by central device 100. In this context, a distinction may be made between static objects, that is, stationary objects, and dynamic objects, that is, moving objects. Moving objects are not suitable, for example, for use as a landmark and may therefore not be used for determining position or for assistance in routing. In the situation represented in FIG. 1, further vehicle 28 is moving and is therefore detected as a dynamic object and not considered during the generation of the map.

Objects, which delimit a roadway, such as the curb 26 shown in FIG. 1, may be utilized to obtain information regarding the course of a roadway. If data about road 20 are also able to be acquired directly, such as in the case of use of a radar sensor, these data may also be utilized directly to generate the map. If traffic symbols, such as the traffic sign 24 shown in FIG. 1, are detected, then these may be evaluated, in order to obtain further information about traffic routing, for example, regarding permissible directions of travel or the like.

In further specific embodiments of the method, a section of the generated map may additionally be transmitted by central device 100 to vehicle 10. This section is determined as a function of the approximate position of vehicle 10 transmitted previously. Using the received map, vehicle 10 may compare positions of objects, which are detected by sensor 12, to positions recorded in the map and, from this, determine its position more accurately than would be possible, for example, using only satellite navigation. In addition, the data obtained using the map may be used, for example, to guide vehicle 10 automatically from a starting position to a target position.

The present invention is not limited to the exemplary embodiments described here and the aspects emphasized in them. On the contrary, a number of modifications, which lie within the scope of actions undertaken by one skilled in the art, are possible within the scope of the present invention.

What is claimed is:

1. A method for generating a map of surroundings of a vehicle, the vehicle including at least one sensor, the method comprising the following steps:
   a) acquiring, by the vehicle, first data, the first data including at least a position of the vehicle and information about a type of the at least one sensor;
   b) transmitting, by the vehicle, the first data to a central device;
   c) selecting, by the central device, perception parameters in view of the first data;
   d) transmitting, by the central device, the selected perception parameters to the vehicle;
   e) receiving, by the vehicle, the selected perception parameters, and configuring the at least one sensor using the selected perception parameters;
   f) monitoring the surroundings of the vehicle by the at least one sensor, raw data being recorded, and the raw data being filtered by the vehicle, using the selected perception parameters;
   g) transmitting, by the vehicle, second data to the central device, the second data being based on the raw data; and
   h) generating and/or updating, by the central device, a map based on the second data.

2. The method as recited in claim 1, wherein the first data include: (i) a vehicle position ascertained using satellite navigation, and/or (ii) an orientation of the vehicle.

3. The method as recited in claim 1, wherein the first data include information about current environmental conditions at the position of the vehicle, and/or the central device obtains information about current environmental conditions at the position of the vehicle via a meteorological service.

4. The method as recited in claim 1, wherein during the selection of the perception parameters by the central device in accordance with step c), perception parameters suitable for generating a map are selected as a function of the position of the vehicle, an orientation of the vehicle, and/or current environmental conditions.

5. The method as recited in claim 1, wherein objects are detected by the vehicle in the filtered raw data, and the second data include filtered raw data and/or detected objects.

6. The method as recited in claim 1, wherein the second data include the filtered raw data.

7. The method as recited in claim 6, wherein objects are detected by the central device in the filtered raw data.

8. The method as recited in claim 1, wherein the generated map is provided to a driver assistance system of the vehicle, at least a section of the map being transmitted to the vehicle by the central device.

9. A central device, comprising:
a computing device; and
a communications device;
wherein the central device is configured to:
    receive, from a vehicle having at least one sensor, first data, the first data including at least a position of the vehicle and information about a type of the at least one sensor;
    select perception parameters in view of the first data;
    transmit the selected perception parameters to the vehicle, the vehicle configuring the at least one sensor using the selected perception parameters, monitoring the surroundings of the vehicle by the at least one sensor, recording raw data, and filtering the raw data using the selected perception parameters;
    receive, from the vehicle, second data to the central device, the second data being based on the raw data; and
    generate and/or update a map based on the second data.

10. A vehicle, comprising:
at least one sensor; and
a communications unit;
wherein the vehicle is configured to:
    acquire first data, the first data including at least a position of the vehicle and information about a type of the at least one sensor;
    transmit the first data to a central device, the central device selecting perception parameters in view of the first data, and transmitting the selected perception parameters to the vehicle;
    receive the selected perception parameters, and configure the at least one sensor using the selected perception parameters;
    monitor the surroundings of the vehicle by the at least one sensor, record raw data, and filter the raw data using the selected perception parameters; and
    transmit second data to the central device, the second data being based on the raw data, the central device generating and/or updating a map based on the second data.

11. The vehicle as recited in claim 10, wherein the at least one sensor is one or more of the following: a radar sensor, or an ultrasonic sensor, or a lidar sensor, or an optical sensor.

* * * * *